(12) United States Patent
Fujita (10) Patent No.: US 7,079,073 B2
(45) Date of Patent: Jul. 18, 2006

(54) RADAR DEVICE FOR VEHICLE AND METHOD FOR ADJUSTING MOUNT ANGLE FOR MOUNTING RADAR DEVICE ON VEHICLE

(75) Inventor: Akihisa Fujita, Hoi-gun (JP)

(73) Assignee: DENSO Corporation, Kariya (JP)

( * ) Notice: Subject to any disclaimer, the term of this patent is extended or adjusted under 35 U.S.C. 154(b) by 190 days.

(21) Appl. No.: 10/902,721

(22) Filed: Jul. 29, 2004

(65) Prior Publication Data

US 2005/0024261 A1 Feb. 3, 2005

(30) Foreign Application Priority Data

Jul. 31, 2003 (JP) .............................. 2003-284073

(51) Int. Cl.
*G01S 7/40* (2006.01)
*G01S 13/93* (2006.01)

(52) U.S. Cl. ........................ 342/174; 342/165; 342/70; 342/192

(58) Field of Classification Search ................. 342/174
See application file for complete search history.

(56) References Cited

U.S. PATENT DOCUMENTS

| | | | |
|---|---|---|---|
| 6,020,844 A | * | 2/2000 | Bai et al. ..................... 342/165 |
| 6,087,995 A | * | 7/2000 | Grace et al. ................. 343/703 |
| 6,335,705 B1 | * | 1/2002 | Grace et al. ................. 343/703 |
| 6,337,656 B1 | | 1/2002 | Natsume et al. |
| 6,556,166 B1 | * | 4/2003 | Searcy et al. ................ 342/165 |
| 6,636,172 B1 | * | 10/2003 | Prestl et al. ................. 342/173 |
| 6,771,210 B1 | * | 8/2004 | Zoratti et al. ................ 342/165 |
| 6,778,131 B1 | * | 8/2004 | Haney et al. ................ 342/174 |
| 6,933,883 B1 | * | 8/2005 | Isaji ............................ 342/174 |

* cited by examiner

*Primary Examiner*—Thomas H. Tarcza
*Assistant Examiner*—Matthew Barker
(74) *Attorney, Agent, or Firm*—Harness, Dickey & Pierce, PLC

(57) ABSTRACT

Reception antenna elements are formed so that the reception beam axis in the vertical direction of at least one reception antenna element of a transmission/reception unit is displaced from the reception beam axes of the other antenna elements. Therefore, the amplitude (intensity) of the reception signals of the reception antennas which are caused by a target is different from the amplitude (intensity) of the reception signal of the reception antenna element, and the amplitude difference is varied depending on the orientations of the reception beam axes in the vertical direction of the reception antenna elements. Accordingly, the amplitude difference when the reception beam axes of the reception antenna elements are correctly oriented to a desired direction is measured in advance, and the amplitude difference thus measured is set as a target amplitude difference, whereby the mount angle of the transmission/reception unit can be easily and accurately adjusted.

14 Claims, 6 Drawing Sheets

RADAR DEVICE FOR VEHICLE AND METHOD FOR ADJUSTING MOUNT ANGLE FOR MOUNTING RADAR DEVICE ON VEHICLE

CROSS REFERENCE TO RELATED APPLICATION

This application is based upon, claims the benefit of priority of, and incorporates by reference the contents of Japanese Patent Application No. 2003-284073 filed on Jul. 31, 2003.

FIELD OF THE INVENTION

The present invention relates to a vehicle radar device for detecting target objects existing around a vehicle concerned by transmission/reception of radar waves, and particularly to a technique of adjusting a mount angle at which the vehicle radar device is mounted on the vehicle concerned.

BACKGROUND OF THE INVENTION

For example, JP-A-2001-51050 discloses a vehicle radar device comprising a transmission antenna for transmitting a radar wave such as an extremely high frequency wave (millimetric-wave) and a reception antenna having plural antenna elements arranged in the width direction of a vehicle. According to this vehicle radar device, the direction to a forward vehicle (i.e., a vehicle traveling in front of a vehicle having the vehicle radar device) or the like as a reflection object is detected on the basis of the phase difference among reception signals received by the plural reception antenna elements, and also the distance and relative speed between the reflection object and the vehicle having the vehicle radar device (hereinafter referred to as "vehicle concerned") are detected by subjecting the reception signals thus received to processing such as frequency analysis, etc. The radar device that can detect the direction and distance to the reflection object and the relative speed between the vehicle concerned and the reflection object (the forward vehicle or the like) as described above has been applied to a device for raising an alarm when the distance between the vehicle concerned and each forward vehicle is short, a device for controlling the vehicle speed of the vehicle concerned so as to keep a predetermined distance to the forward vehicle or the like.

In order to enhance the detection sensitivity of the above radar device to a reflection (target) object such as a forward vehicle or the like, it is required that the beam axis of reception beam of the reception antenna should be correctly oriented in both the vertical direction (the vehicle height direction) and the horizontal direction (vehicle width direction) to an area where the reflection object such as the forward vehicle or the like can be detected. The direction (orientation) of the beam axis in the horizontal direction (vehicle width direction) of the reception antenna can be easily identified on the basis of the reception signals of the plural antenna elements arranged in the vehicle width direction, however, the direction (orientation) of the beam axis in the vertical direction (vehicle height direction) of the reception antenna cannot be identified on the basis of the reception signals.

Therefore, it has been generally carried out to equip a radar pointer jig and a level to a transmission/reception unit containing a transmission antenna and a reception antenna, and adjust the mount angle of the transmission/reception unit to the vehicle particularly in the vertical direction by using the radar pointer jig and the level. Accordingly, much labor has been hitherto needed to the adjusting work of the mount angle because it is required to keep high precision to make the beam axes coincident with the laser pointer axes, etc., and also it has been hitherto difficult to keep the precision.

SUMMARY OF THE INVENTION

The present invention has been implemented in view of the foregoing situation, and has an object to provide a vehicle radar device which can easily and correctly adjust a mount angle at which a reception antenna having plural reception antenna elements arranged in the width direction of a vehicle is mounted on the vehicle, and a method of adjusting the mount angle for mounting the radar device on the vehicle.

In order to attain the above object, a radar device for a vehicle according to a first aspect of the present invention comprises a reception antenna having plural reception antenna elements arranged along the width direction of the vehicle so that the beam axis of at least one of plural reception beams in the vertical direction is displaced from the beam axes of the other reception beams in the vertical direction, a transmission antenna having a transmission beam area that covers areas of the reception beams of the plural reception antenna elements, and an amplitude difference calculator for making the transmission antenna transmit a transmission signal to a target disposed at a predetermined position when the mount angle for mounting the radar device on the vehicle is adjusted, making the plural reception antenna elements receive a reflection wave of the transmission signal from the target to generate reception signals, and then calculating the amplitude difference between the amplitude of the reception signal of the reception antenna element having the displaced reception beam axis and the amplitude of the reception signal of the reception antenna elements having the non-displaced reception beam axes.

According to the vehicle radar device of the first aspect, the reception beam axis in the vertical direction of at least one reception antenna element is displaced from the reception beam axes of the other antenna elements. Therefore, when the reception beam axes of the reception beams of the other reception antenna elements having the non-displaced beam axes are correctly oriented to a desired direction in the vertical direction with respect to the target, the amplitude (intensity) of the reception signals of the other reception antenna elements having the non-displaced reception beam axes is larger than the amplitude (intensity) of the reception signal of the reception antenna element having the displaced reception beam axis, and thus an amplitude difference occurs therebetween. The magnitude of the amplitude difference varies depending on the orientations of the reception beam axes of the reception antenna elements in the vertical direction. Accordingly, the amplitude difference when the reception beam axes of the reception beams of the reception antenna elements having the non-displaced reception beam axes are correctly oriented to the desired direction with respect to the target is measured in advance, the amplitude difference thus measured is set as a target amplitude difference, and the mount angle of the reception antenna comprising the reception antenna elements is adjusted so that the amplitude difference calculated by the amplitude difference calculator is coincident with the target amplitude difference in the mount angle adjusting work of the reception antenna, whereby the adjustment can be easily and accurately performed.

According to a second aspect of the invention, it is preferable that the vehicle radar device of the first aspect is further equipped with a storage unit for storing the relationship between the amplitude difference and the orientation (direction) of the reception beam axes of the reception antenna elements having the non-displaced reception beam axes in the vertical direction. In this case, even when there is some individual difference with respect to the direction of the beam axis of the reception antenna elements among respective radar devices, the beam axis of the reception antenna elements having the non-displaced reception beam axes can be adjusted so as to be correctly oriented to a desired direction. When the individual difference is small with respect to the direction of the beam axis of the reception antenna elements among respective radar devices, the adjustment can be carried out by using a fixed target amplitude difference. In this case, it is unnecessary to store the relationship described above.

Furthermore, according to a third aspect of the invention, it is preferable in the vehicle radar device that a transmission signal which is subjected to frequency modulation so that the frequency varies continuously is transmitted from the transmission antenna, the amplitude difference calculator is equipped with a beat signal generator for generating beat signals, each of which corresponds to the frequency difference between the transmission signal and each of the plural reception signals occurring in the plural reception antenna elements, and a frequency spectrum calculator for calculating a frequency spectrum representing the magnitude of each frequency component contained in each of the beat signals generated by the beat signal generator, and the amplitude difference is calculated while the peak of the frequency spectrum calculated by the frequency spectrum calculator is set as the amplitude of each reception signal.

The peak of the frequency spectrum calculated by the above method represents the intensity of the reflection wave from the target with high precision. Therefore, the amplitude difference can be accurately calculated by calculating the amplitude difference with the peak of the frequency spectrum as the amplitude of the reception signal. Accordingly, the mount angle of the reception antenna can be accurately adjusted on the basis of the amplitude difference.

According to a fourth aspect of the invention, the vehicle radar device is equipped with a reflection object detector for detecting the distance to a reflection object reflecting the transmission signal and the relative speed between the vehicle concerned and the reflection object on the basis of the peak of the frequency spectrum calculated by the frequency spectrum calculator. That is, the vehicle radar device can calculate the amplitude difference described above by merely equipping the vehicle radar device with the beat signal generator, the frequency spectrum calculator and the reflection object detector which are normally equipped to a radar device to detect the distance to the reflection object and the relative speed between the vehicle concerned and the reflection object.

Since the reception antenna of the vehicle radar device has plural reception antenna elements, the direction to the reflection object in the vehicle width direction can be detected on the basis of the phase difference in the peak frequency of the frequency spectra calculated by the frequency spectrum calculator according to a fifth aspect of the invention.

According to a sixth aspect of the invention, the amplitude of the reception signals of the reception antenna elements having the non-displaced reception beam axes is preferably calculated by averaging the reception signals of the reception antenna elements. Accordingly, the S/N ratio is enhanced, and the amplitude difference can be more accurately calculated. According to a seventh aspect of the invention, when the reception signals of the plural reception antenna elements are averaged, the reception signal of the reception antenna element having the displaced reception beam axis may be contained in the reception signals of the plural antenna elements. In this case, some amplitude difference occurs between the amplitude of the reception signal of the reception antenna element having the displaced reception beam axis and the amplitude of the average result of the reception signals of the plural reception antenna elements.

According to an eighth aspect of the invention, it is preferable that the reception beam axis of a reception antenna element disposed at an end portion of the vehicle in the vehicle width direction is displaced. When the direction to the reflection object is detected, the reception signal of the reception antenna element disposed at the end portion has a smaller effect on the detection of the direction to the reflection object than the reception signals of the antenna elements disposed at the center portion, and thus the effect of the displacement of the reception beam axis can be reduced.

According to a ninth aspect of the invention, the reception beam axis is displaced so as to direct to the ground surface, and the reflection object detector may use the reception signals of the reception antenna elements having the non-displaced reception beam axes in order to detect reflection objects spaced from the vehicle concerned at a predetermined distance or more and use the reception signal of the reception antenna element having the displaced reception beam axis in order to detect reflection objects existing within a predetermined distance from the vehicle concerned. Accordingly, even when the reception beam axis of the reception antenna element is displaced in the direction to the ground surface, the detection performance of the reflection objects existing at a long distance can be prevented from being lowered. Furthermore, the reception antenna elements for detecting the reflection objects existing at a short distance can be set separately from the reception antenna elements for detecting the long distance reflection objects.

According to a tenth aspect of the invention, a mount angle adjusting method for adjusting a mount angle at which a vehicle radar device is mounted on a vehicle comprises a transmission step of transmitting a transmission signal to a target disposed at a predetermined position, a generating step of receiving a reflection wave of the transmission signal from the target through plural reception antenna elements and generating reception signals, and a calculating step of calculating the amplitude difference between the amplitude of a reception signal of a reception antenna element having a displaced reception beam axis and the amplitude of reception signals of reception antenna elements having non-displaced reception beam axes.

As described above, the amplitude difference between the amplitude of the reception signal of the reception antenna element having the displaced reception beam axis and the amplitude of the reception signals of the reception antenna elements having the non-displaced reception beam axes is calculated, and the mount angle of the reception antenna in the vertical direction is adjusted so that the amplitude difference is equal to a predetermined value, whereby the reception beam axis of the reception antenna elements can be oriented to a desired direction in the vertical direction of the vehicle.

In this case, according to an eleventh aspect of the invention, it is preferable that the relationship between the amplitude difference and the direction of the reception beam axis of the reception antenna elements having the non-displaced reception beam axes is determined in advance, and the mount angle of the reception antenna in the vehicle vertical direction is adjusted on the basis of the relationship thus determined. Accordingly, the mount angle of the reception antenna can be adjusted so that the reception beam axis of the reception antenna elements having the non-displaced reception beam axes is oriented to a desired direction with respect to the target in the vertical direction of the vehicle concerned.

The mount angle adjusting method according to twelfth to fourteenth aspects of the invention have the same operation as the third, sixth and seventh aspects of the invention, and thus the description thereof is omitted.

BRIEF DESCRIPTION OF THE DRAWINGS

The above and other objects, features and advantages of the present invention will become more apparent from the following detailed description made with reference to the accompanying drawings. In the drawings:

FIGS. 2A and 2B show the detection principle of detecting the distance and relative speed between the vehicle concerned and a reflection object by the radar device, wherein

DETAILED DESCRIPTION OF THE PREFERRED EMBODIMENTS

Preferred embodiments according to the invention will be described hereunder with reference to the accompanying drawings.

(First Embodiment)

Figure 1:
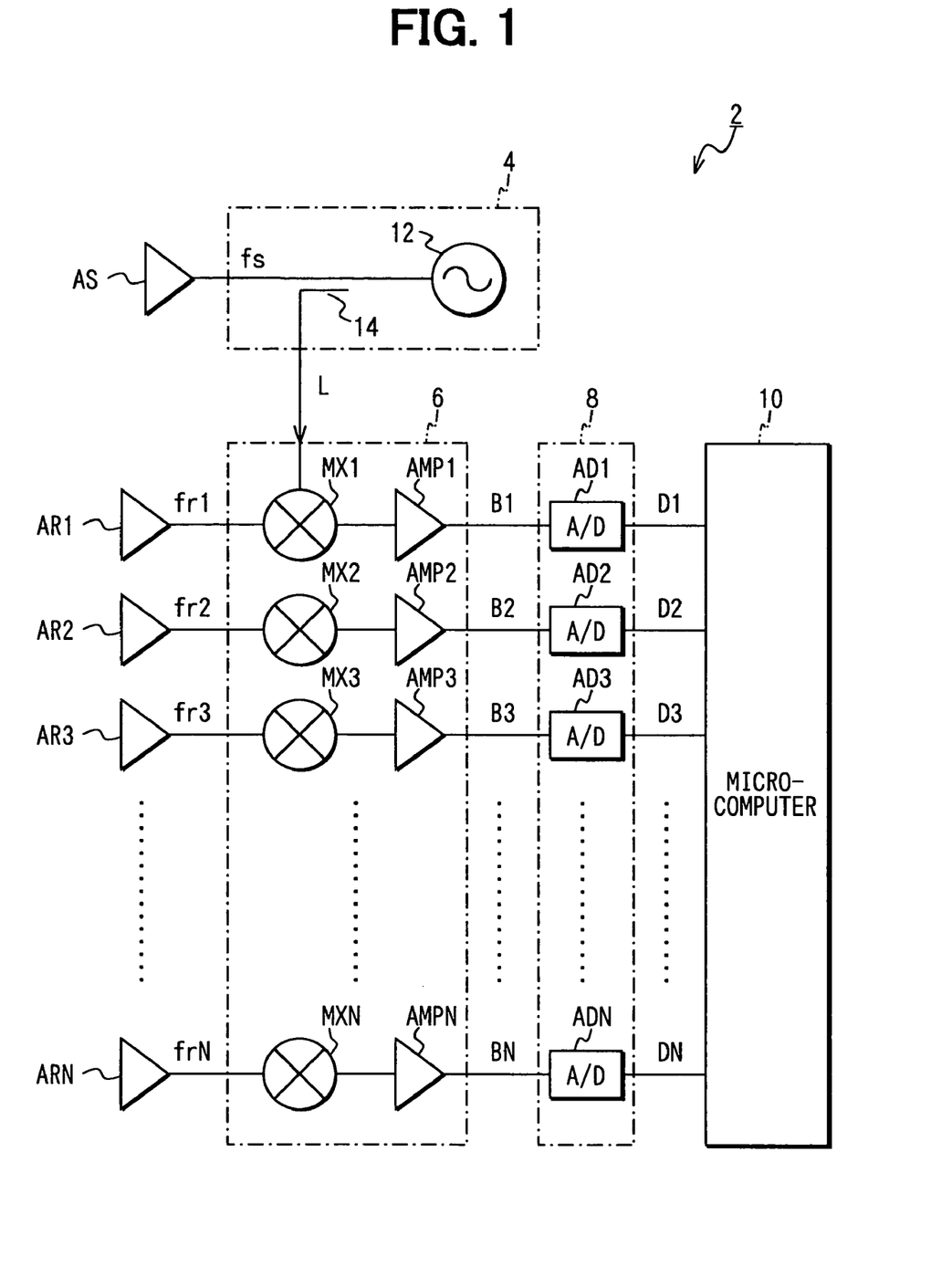
FIG. 1 is a block diagram showing the overall construction of a vehicle radar device according to a first embodiment of the invention.

A first embodiment according to the invention will be described hereunder with reference to the accompanying drawings. FIG. 1 is a block diagram showing the overall construction of a vehicle radar device according to the embodiment.

As shown in FIG. 1, a radar device 2 according to this embodiment is equipped with a transmitter 4 for transmitting a radar wave in an extremely high frequency band (millimetric-wave band) through a transmission antenna AS. The transmitter 4 comprises a high-frequency oscillator 12 for generating a high-frequency signal of the extremely high frequency band which is modulated so that gradual increase and gradual reduction of the frequency thereof with time lapse are alternately repeated, and a distributor 14 for distributing the power of the output of the high-frequency oscillator 12 to a transmission signal fs and a local signal L. The transmission signal fs is supplied to the transmission antenna AS and the local signal L is supplied to a receiver 6.

The radar device 2 of this embodiment is equipped with a reception antenna having N reception antenna elements AR1 to ARN for receiving a radar wave (hereinafter referred to as "reflection wave") reflected by a reflection object such as a forward vehicle or the like. When the reflection wave is received by the N antenna elements AR1 to ARN, the respective antenna elements AR1 to ARN generate the reception signals fr1 to frN corresponding to the reflection wave received thereby, and supply the reception signals fr1 to frN to the receiver 6.

The receiver 6 comprises N mixers MX1 to MXN which are equipped in connection with the antenna elements AR1 to ARN and mix the respective reception signals fr1 to frN with the local signal L to generate beat signals B1 to BN, each of which corresponds to the differential frequency between each reception signal and the local signal L, and N amplifiers AMP1 to AMPN for amplifying the beat signals B1 to BN generated in the respective mixers MX1 to MXN. The respective amplifiers AMP1 to AMPN have a filter function of removing unnecessary high-frequency components from the beat signals B1 to BN.

The beat signals B1 to BN amplified by the amplifiers AMP1 to AMPN are supplied to an A/D converting portion 8. The A/D converting portion 8 comprises A/D converters AD1 to ADN of N for sampling the beat signals B1 to BN and converting them to digital data D1 to DN. The digital data D1 to DN converted from the respective beat signals B1 to BN by the A/D converters AD1 to ADN are supplied to a microcomputer 10 and used for various kinds of signal processing.

In the above embodiment, the mixers MX1 to MXN, the amplifiers AMP1 to AMPN and the A/D converters AD1 to ADN, the numbers of which are equal to N, are equipped in connection with the reception antenna elements AR1 to ARN of N. However, in place of this style, only one mixer, only one amplifier and only one A/D converter may be equipped. In this case, the reception signals of the N reception antenna elements AR1 to ARN are successively selected and supplied to the mixer one by one with a multiplexer, for example.

The microcomputer 10 is mainly constructed by CPU, ROM and RAM, and it executes the detection processing of detecting the distance between the vehicle concerned and a reflection target such as a forward vehicle or the like, the relative speed therebetween and the direction to the reflection target on the basis of the digital data D1 to DN from the A/D converting portion 8. The microcomputer 10 is equipped with a digital signal processor for executing the Fast Fourier Transformation (FFT) on the digital data D1 to DN when the detection processing is executed.

Figure 2A:
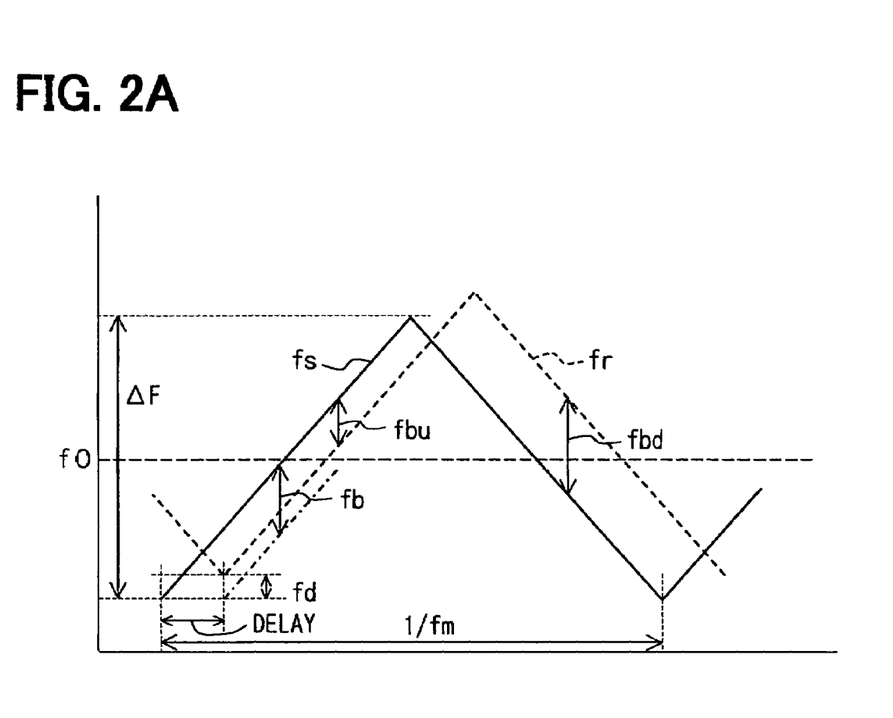
FIG. 2A is a graph showing a transmission signal fs and a reception signal fr.
Figure 2B:
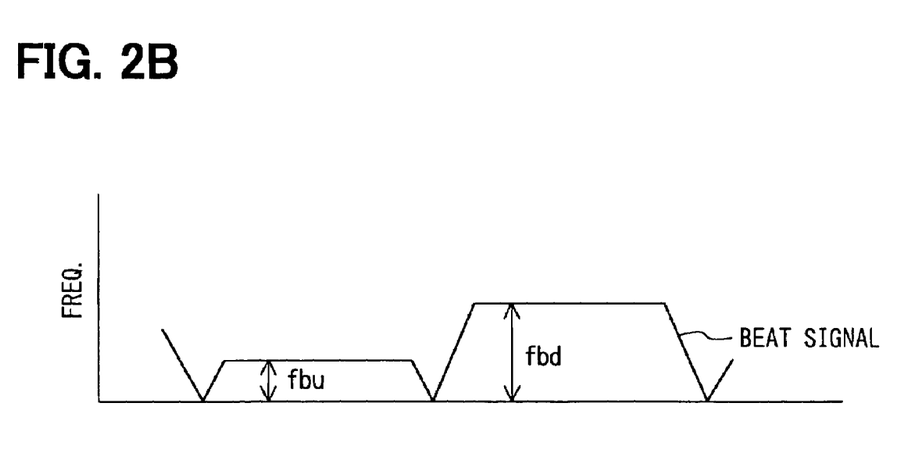
FIG. 2B is a graph showing beat frequencies corresponding to the difference in frequency between the transmission signal fs and the reception signal fr.

In the vehicle radar device 2 thus constructed, a radar wave as a frequency-modulated continuous wave (FMCW) is transmitted from the transmitter 4 through the transmission antenna AS as shown in FIG. 2A. When the radar wave thus transmitted is reflected from a reflection target such as a forward vehicle or the like, the reflection wave from the reflection target is received by each of the reception antenna elements AR1 to ARN. At this time, the reception signal occurring in each of the reception antennas AR1 to ARN is mixed with the local signal L in the corresponding one of the mixers MX1 to MXN of the receiver 6, thereby generating the beat signals B1 to BN each of which corresponds to the differential frequency component between each reception signal and the local signal L (transmission signal fr). Each of the A/D converters AD1 to ADN samples each of the beat signals B1 to BN at a predetermined number of times and subjected to A/D conversion every half period of the frequency variation period of the transmission signal fs, that is, every frequency increasing portion at which the frequency gradually increases and every frequency decreasing portion at which the frequency gradually decreases. Therefore, the beat signals are respectively generated at the frequency increasing portions and the frequency decreasing portions as shown in FIG. 2B.

Here, the method of detecting the distance and relative speed between the vehicle concerned and the reflection target on the basis of the beat signals at the frequency increasing portion and the frequency decreasing portion will be described.

In FIG. 2A, when the vehicle having the radar device mounted thereon and the reflection target reflecting the radar wave have the same moving speed (relative speed=0), the radar wave reflected from the reflection target is delayed by the time needed for the radar wave to go and return over the distance D between the vehicle and the reflection target. In this case, the reception signal fr is shifted from the transmission signal fs along the time axis by the delay time, and the increasing portion peak frequency fbu and the decreasing portion peak frequency fbd are equal to each other (fbu=fbd).

On the other hand, when the vehicle having the radar device mounted thereon and the reflection object have different moving speeds (relative speed V≠0), the radar wave reflected from the reflection object suffers Doppler shift corresponding to the relative speed V between the reflection object and the vehicle concerned. Therefore, the reception signal fr is shifted along the frequency axis by the amount corresponding to the Doppler component caused by the relative speed V in addition to the shift along the time axis by the delay time corresponding to the distance D between the vehicle concerned and the reflection object. In this case, as shown in FIGS. 2A and 2B, the increasing portion peak frequency fbu and the decreasing portion peak frequency fdb are different from each other (fb1≠fb2).

As described above, the reception signal fr is shifted on both the time axis and the frequency axis in accordance with the distance D and relative speed V between the vehicle concerned and the reflection object. In other words, the difference in frequency on the time axis between the transmission signal fs and the reception signal fr corresponds to the distance D between the vehicle concerned and the reflection object, and the difference in frequency on the frequency axis between the transmission signal fs and the reception signal fr corresponds to the relative speed V between the vehicle concerned and the reflection object. These frequencies can be calculated from the equation 1 and the equation 2.

The frequency $fb$ corresponding to the distance
$$D=(|fbu|+|fdb|)/2 \quad \text{(Equation 1)}$$

The frequency $fd$ corresponding to the relative speed
$$V=(|fbu|-|fdb|)/2 \quad \text{(Equation 2)}$$

The distance D and relative speed V between the vehicle concerned and the reflection object can be calculated on the basis of these frequencies fb, fd corresponding to the distance D and the relative speed V by the following equations 3 and 4.

$$D=\{C/(4\times\Delta F\times fm)\}\times fb \quad \text{(Equation 3)}$$

$$V=\{C/(2\times f0)\}\times fd \quad \text{(Equation 4)}$$

wherein ΔF represents the frequency modulation width of the transmission signal fs, f0 represents the center frequency of the transmission signal fs, fm represents the repetitive frequency, and C represents the velocity of light.

Next, the method of adjusting the mount angle at which the transmission/reception unit having the transmission antenna AS and the plural reception antenna elements AR1 to ARN in the vehicle radar device of this embodiment is mounted on the vehicle.

Figure 3:
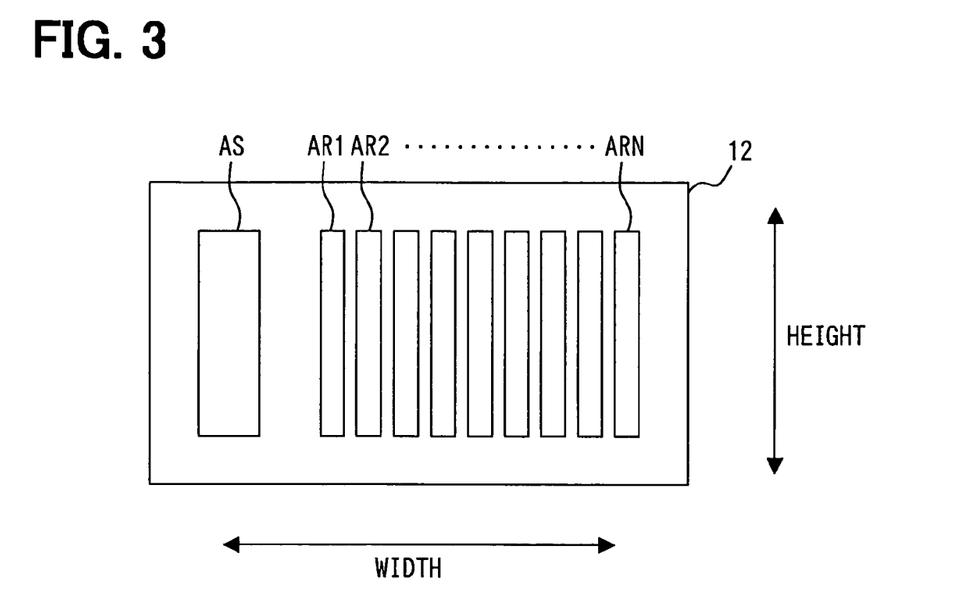
FIG. 3 is a plan view showing the construction of a transmission/reception unit having a transmission antenna AS and plural reception antenna elements AR1 to ARN.

FIG. 3 is a plan view showing the construction of a reception/transmission unit 12 having a transmission antenna AS and plural reception antenna elements AR1 to ARN. As shown in FIG. 3, the transmission antenna AS and the plural reception antenna elements AR1 to ARN are formed on the same substrate. The transmission antenna AS is located at one end portion of the common substrate, and it has a transmission beam area for transmitting a radar wave to an area which can cover the reception beam areas of all the reception antenna elements AR1 to ARN.

Figure 4:
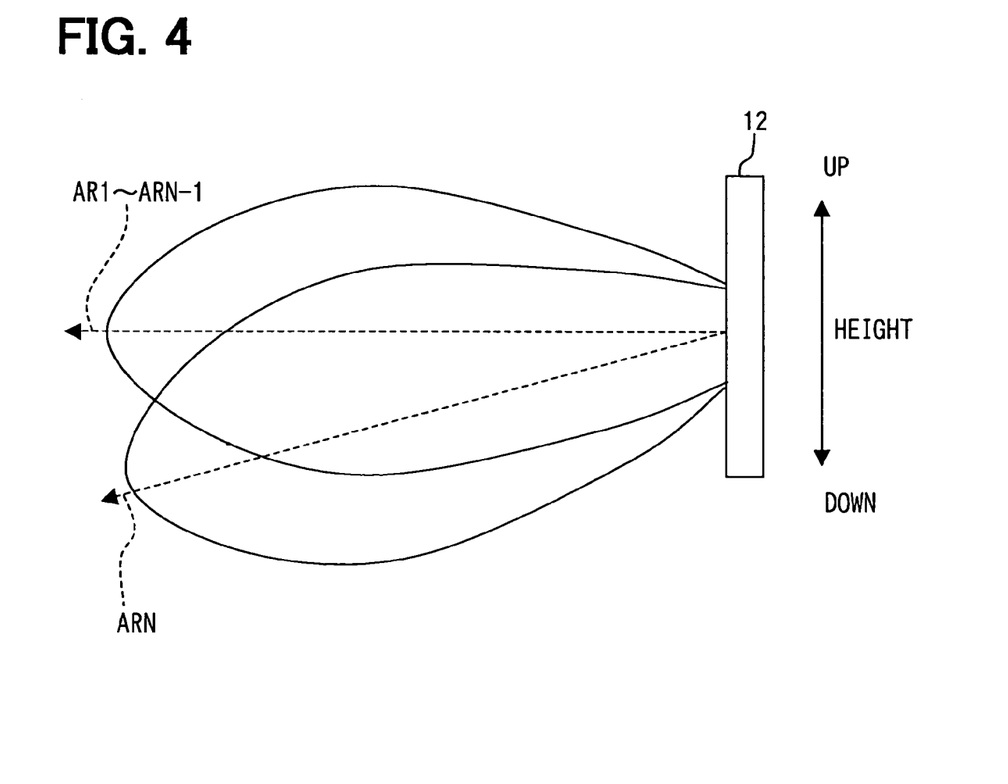
FIG. 4 is a diagram showing the aspect that the reception beam axis of the reception antenna element ARN is downwardly displaced from the reception beam axis of the reception antenna elements AR1 to ARN-1.

The N reception antenna elements AR1 to ARN are arranged along the vehicle width direction in a line so as to be spaced equally. The N reception antenna elements AR1 to AR are designed so that the reception beams thereof are mutually overlapped with one another, and thus the direction to a reflection object such as a forward vehicle or the like in the vehicle width direction can be calculated on the basis of the phase difference among the reflection waves from the reflection object. Furthermore, with respect to the reception beams of the N reception antenna elements AR1 to ARN, the respective reception antenna elements AR1 to ARN are formed on the common substrate so that the reception beam axis of at least one reception antenna element (in this embodiment, the reception antenna element ARN at the opposite end portion to the transmission antenna AS) is displaced downwardly (in the direction to the ground surface) from the reception beam axes of the remaining reception antenna elements (in this embodiment, the reception antenna elements AR1 to ARN-1).

Therefore, some difference occurs in reception sensitivity between the reception antenna ARN and each of the reception antenna element AR1 to ARN-1 in accordance with the mount angle at which the reception antenna is mounted on the vehicle, so that the signal intensity of each of the reception signals fr1 to frN-1 of the reception antenna elements AR1 to ARN-1 is different from the signal intensity of the reception signal frN of the reception antenna element ARN. This difference in signal intensity is uniquely determined in accordance with the displacement angle between the reception beam axis of each of the reception antenna elements AR1 to ARN-1 and the reception bean axis of the reception antenna element ARN. According to this embodiment, the orientation (direction) in the vertical direction (vehicle height direction) of the reception beam axes of the reception antenna elements AR1 to ARN-1 can be correctly adjusted by utilizing the relationship as described above. A specific example of the adjusting method thereof will be described with reference to the flowchart of FIG. 5.

Figure 5:
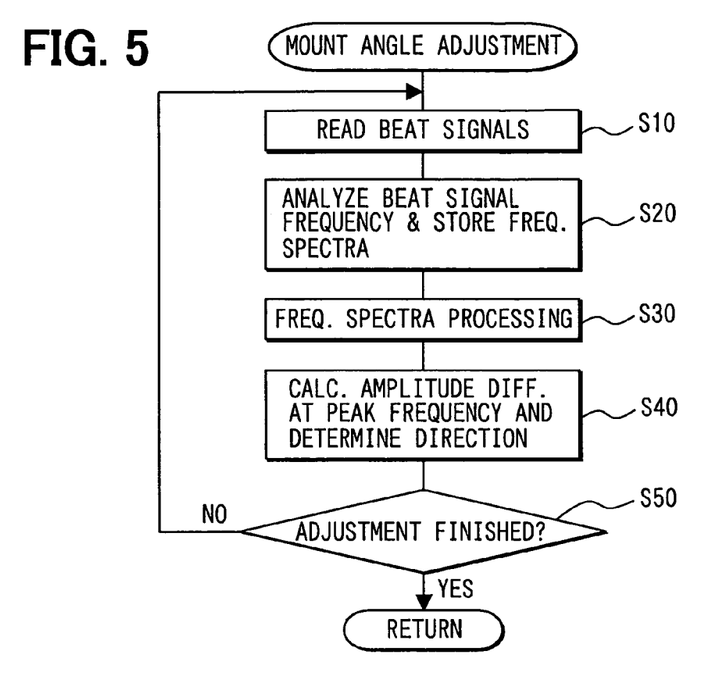
FIG. 5 is a flowchart showing processing executed in the radar device to adjust a mount angle of the transmission/reception unit to the vehicle concerned.
Figure 6:
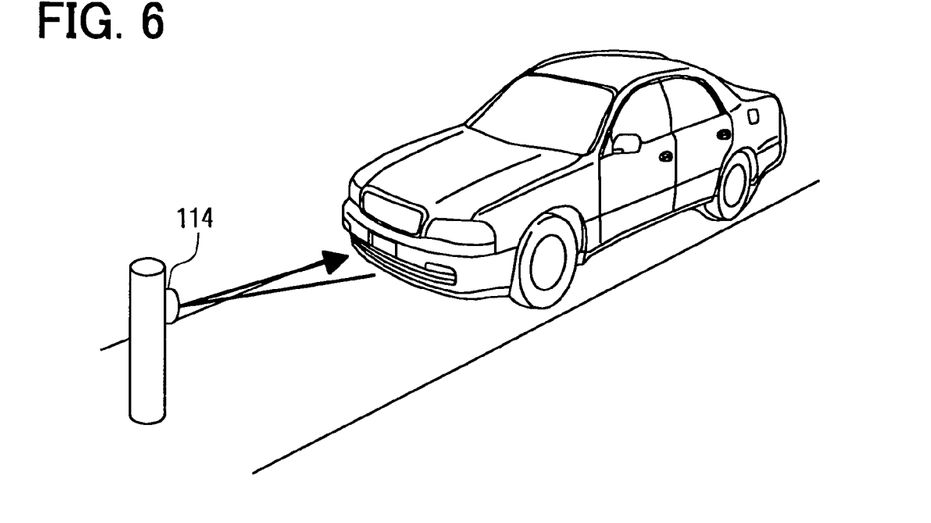
FIG. 6 is a perspective view showing the positional relationship between the vehicle concerned and a target.

First, as shown in FIG. 6, a target 114 disposed at a predetermined height is moved so as to be spaced at a predetermined distance from the vehicle concerned on which the transmission/reception unit 12 is temporarily mounted. Under this state, the processing shown in the flowchart of FIG. 5 is executed to set the mount angle in the vertical direction of the transmission/reception unit 12, that is, the orientation (direction) of the reception beam axis of the reception antenna elements AR1 to ARN-1 in the vertical direction.

In the flowchart of FIG. 5, in step S10, a radar wave is first transmitted from the transmission antenna AS to the target 114, and the reflection wave reflected from the target 114 is received by the respective reception antenna elements AR1 to ARN. At this time, the reception of the reflection wave by each of the reception antenna elements AR1 to ARN makes the receiver 6 output the beat signals B1 to BN corresponding to the reception signals fr1 to frN of the respective reception antenna elements AR1 to ARN. The beat signals B1 to BN are converted to the digital data D1 to DN by the A/D converting portion 8, and then read into the microcomputer 10 and temporarily stored in RAM. The beat signals B1 to BN at this time are achieved for at least one of the frequency increasing portion and the frequency decreasing portion.

In subsequent step S20, the frequency analysis processing (Fast Fourier Transformation processing) is executed on the respective digital data D1 to DN stored as the beat signals B1 to BN in RAM. As a result of the Fast Fourier Transformation processing, a complex vector of the beat signals B1 to BN for every frequency is achieved. The absolute value of the complex vector indicates the amplitude (intensity) of each corresponding frequency. That is, the spectral data indicating the intensity is achieved for every frequency with respect to each beat signal B1 to BN through the Fast Fourier Transformation processing. Furthermore, in step S20, the frequency spectral data of the reception antenna element ARN having the displaced reception beam axis is temporarily stored in RAM.

Subsequently, in step S30, the frequency spectral data calculated for the beat signals B1 to BN of all the reception antenna elements AR1 to ARN are subjected to averaging processing. In step S40, the peak frequency is extracted from the spectral data thus averaged. Here, different noises are superimposed on the respective beat signals B1 to BN, and the routes of the respective reception channels are subtly different from one another and the respective antennas AR1 to ARN are subtly different in performance. Therefore, some displacement may occur among the peak frequencies of the respective beat signals B1 to BN. Accordingly, the spectral data representing the intensifies of the respective frequency components of the respective beat signals B1 to BN are averaged, and the common peak frequency is extracted from the average result as described above. Since the noises are random, the intensities of the noise components are smaller than the intensity of the peak frequency, so that the S/N ratio can be enhanced. As the extraction method of the peak frequency, may be used a method of successively determining the variation of the amplitude of each frequency and specifying the frequency concerned as the peak frequency, assuming that the peak exists at a frequency at which the sign of the variation of the amplitude is inverted from "plus" to "minus" before and after each variation.

When the peak frequency is extracted as described above, the amplitude difference between the amplitude of the frequency spectral data of the reception antenna element ARN and the amplitude of the averaged spectral data at the peak frequency is calculated, and then output to an angle display unit (not shown) for converting the amplitude difference to the corresponding direction. Both the amplitudes are generated by the target 114 spaced from the vehicle concerned at a predetermined distance, and the amplitude difference therebetween is varied in accordance with the orientations (the directions to the target 114) of the reception beam axes of the reception antenna elements AR1 to ARN-1 and the reception beam axis of the reception antenna element ARN which are displaced at a predetermined angle in advance. That is, when the amplitude difference is coincident with a target amplitude difference calculated in advance, the reception beam axes of the reception antenna elements AR1 to ARN-1 are oriented to a desired direction with respect to the target. Therefore, when the direction displayed is displaced from the target direction, a worker for adjusting the mount angle of the transmission/reception unit temporarily installed on the vehicle changes the mount angle and instructs the radar device to execute the above-described processing again. When the direction displayed is coincident with the target direction, the worker instructs the vehicle radar device to finish the adjusting work.

Figure 7:
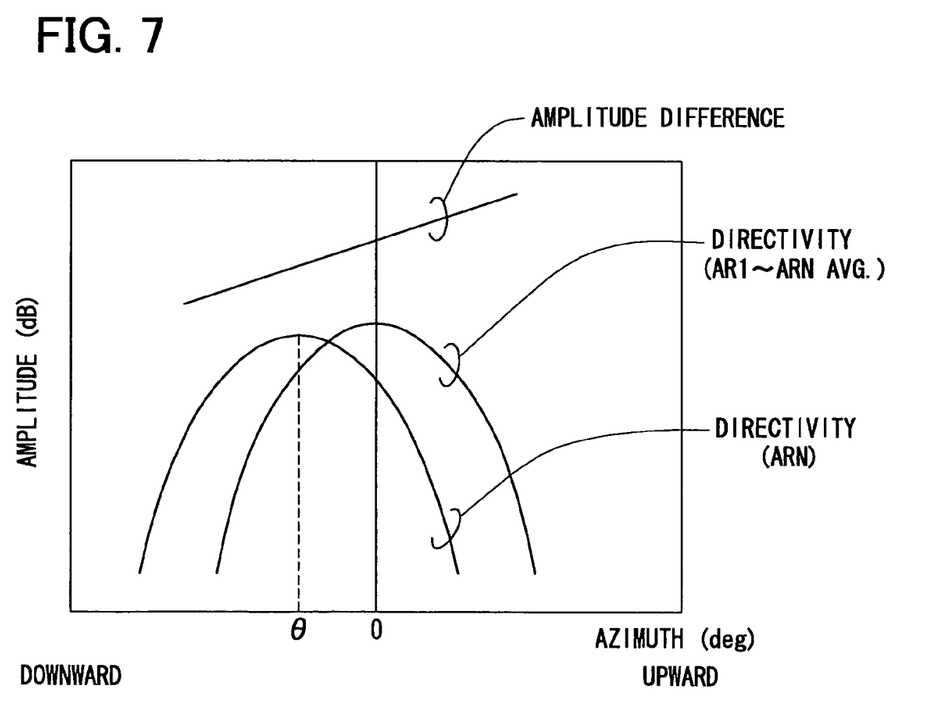
FIG. 7 is a graph showing the relationship between the orientation of the plural reception antenna elements AR1 to ARN in the height direction and the amplitude (difference)

Here, FIG. 7 is a graph showing the relationship between the amplitude (difference) and the directions of the plural reception antenna elements AR1 to ARN in the height direction. In the graph of FIG. 7, the abscissa axis represents the direction in the vertical direction (i.e., azimuth), and the target direction in the vertical direction (target azimuth) is set to zero (deg). The ordinate axis represents the amplitude (difference) by decibel (db).

As shown in FIG. 7, the average amplitude achieved from the spectral data of the reception signals fr1 to frN of the reception antenna elements AR1 to ARN at the azimuth 0 (degree) (hereinafter referred to as the average amplitude of the reception antenna elements AR1 to ARN) is substantially maximum, and the amplitude achieved from the spectral data of the reception signal frN of the reception antenna element ARN (hereinafter referred to as the amplitude of the reception antenna ARN) is maximum at an azimuth of about $\theta$ (deg). This means that the reception beam axis of each of the reception antenna elements AR1 to ARN-1 and the reception beam axis of the reception antenna element ARN are displaced from each other by about $\theta$ (deg). Furthermore, the reception beam axis of the reception antenna element ARN is downwardly displaced as shown in FIG. 7, and thus when the transmission/reception unit 12 is oriented upwardly with respect to a target orientation, the amplitude of the reception antenna element ARN is larger than the average amplitude of the antenna elements AR1 to ARN in the neighborhood of the maximum value of the amplitude of the reception antenna element ARN. On the other hand, when the transmission/reception unit 12 is oriented downwardly with respect to the target orientation, the reception sensitivity of the reception antenna element ARN is more greatly reduced than the reception sensitivity of the reception antenna elements AR1 to ARN-1, and thus the average amplitude of the reception antenna elements AR1 to ARN is larger than the amplitude of the reception antenna element ARN.

The average amplitude of the reception antenna elements AR1 to ARN and the amplitude of the reception antenna element ARN have the magnitude relationship as described above. As shown in FIG. 7, when the transmission/reception unit 12 is upwardly oriented with respect to the target orientation, the amplitude difference ranges from a minus value to a plus value less than a predetermined value. On the other hand, when the transmission/reception unit 12 is downwardly oriented with respect to the target orientation, the amplitude difference is equal to a plus value larger the predetermined value. As described above, the amplitude difference has a simply increasing characteristic in the neighborhood of the target orientation, and thus the mount angle of the transmission/reception unit 12 can be easily adjusted by setting the azimuth 0 (deg) as the target azimuth (orientation).

The orientation in the vertical direction (i.e., the azimuth) set as the target orientation is dependent on the height at which the target 114 is set, and it is not necessarily set to the azimuth 0. For example, it may be set to a plus or minus predetermined azimuth value. Furthermore, in the embodiment described above, the amplitude between the amplitude of the reception antenna element ARN having the displaced reception beam axis and the average amplitude of all the reception antenna elements AR1 to ARN is converted to the orientation (azimuth). However, the amplitude difference between the average amplitude of the reception antenna elements AR1 to ARN-1 having the non-displaced reception beam axes and the amplitude of any one of the reception antenna elements AR1 to ARN-1 having the non-displaced reception beam axes may be calculated and converted to the orientation (azimuth), and then the mount angle of the transmission/reception unit 12 may be adjusted so that the orientation (azimuth) thus calculated is coincident with the target orientation (azimuth).

Furthermore, in the above-described embodiment, the target orientation (azimuth) corresponding to the target amplitude difference is calculated in advance. However, with respect to each individual radar device, the relationship between the amplitude difference and the orientation (azimuth) as shown in FIG. 7 may be measured and stored in a memory of the radar device. When the transmission/reception unit 12 of the radar device is mounted on the vehicle, the measurement data thus stored are read out, and the mount angle of the transmission/reception unit 12 is adjusted so that the azimuth converted from the amplitude difference is equal to 0 (deg). According to this mode, even when some individual difference exists in the orientation of the reception beam axes of the reception antenna elements among respective radar devices, the mount angle can be adjusted so that the reception beam axes of the reception antenna elements having the non-displaced reception beam axes can be correctly oriented to the desired direction.

Figure 8:
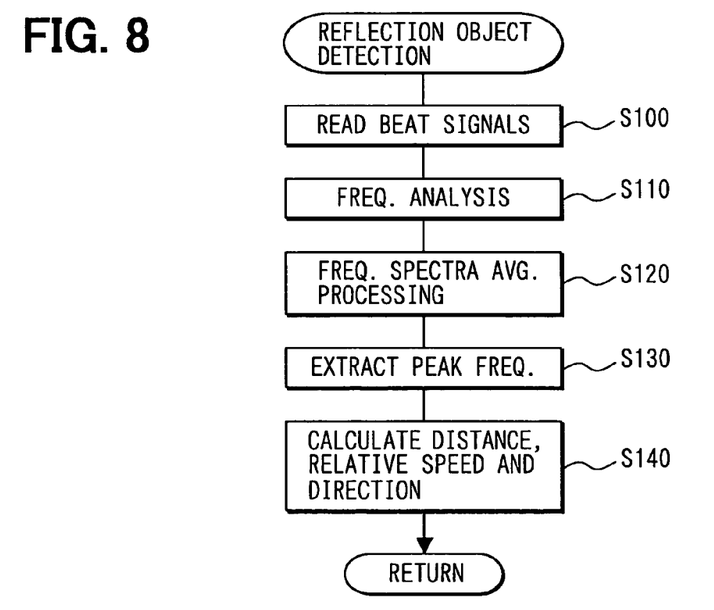
FIG. 8 is a flowchart showing the detection processing of detecting the distance to a reflection object, the relative speed between the vehicle concerned and the reflection object, and the direction to the reflection object in the first embodiment.

Next, the detection processing of detecting the distance to the reflection object, the relative speed between the vehicle concerned and the reflection object and the direction to the reflection object which is executed by the microcomputer 10 will be described with reference to the flowchart of FIG. 8.

First, in step S100, a radar wave reflected from a reflection object such as a forward vehicle or the like is received, and each of the digital data D1 to DN of the beat signals B1 to BN output from the receiver 6 is read out at a predetermined number of times at the frequency increasing portion and the frequency decreasing portion, and then temporarily stored in RAM.

In the subsequent step S110, the digital data D1 to DN which are stored as the beat signals B1 to BN of the frequency increasing portion and the frequency decreasing portion in RAM are subjected to the frequency analysis processing (Fast Fourier Transformation). Through the Fast Fourier Transformation processing, the spectral data indicating the intensity for every frequency is achieved for each of the beat signals B1 to BN. The Fast Fourier Transformation processing is separately carried out on the beat signals B1 to BN at the frequency increasing portion and the beat signals B1 to BN at the frequency decreasing portion.

In the subsequent step S120, the frequency spectral data calculated for the respective beat signals B1 to BN are subjected to the average processing for every frequency increasing portion and every frequency decreasing portion. Thereafter, in step S130, the common increasing portion peak frequency and decreasing peak frequency of the beat signals B1 to BN are extracted from the averaged increasing portion spectral data and the averaged decreasing portion spectral data. In this case, all the frequency components providing the peaks on the spectra are extracted from the increasing portion spectral data and the decreasing portion spectral data, and the frequencies concerned are specified as the peak frequencies. When the reflection waves reflected from the same reflection object are received, the respective beat signals B1 to BN are theoretically estimated to have the peak frequency components at the same frequency. Therefore, it may be adopted to determine the spectral data of one of the beat signals B1 to BN, extract the peak frequency from the spectral data thereof and estimate that the same peak frequency occurs in the other beat signals B1 to BN. Through the processing of the step S130, the common increasing portion peak frequency and decreasing portion peak frequency of the beat signals B1 to BN are extracted.

In step S140, the distance D and relative speed V between the vehicle concerned and the reflection object are calculated on the basis of the increasing portion peak frequency and the decreasing portion peak frequency extracted in the step S130 by using the equations 1 to 4. When there are plural increasing peak frequencies and decreasing portion peak frequencies, the distance D and the relative speed V are calculated after pair matching is carried out on the basis of the direction to the reflection object, etc. which induce each peak frequency.

In the above embodiment, the frequency analysis processing (spatial FFT) is carried out on the frequency signals (beat frequency signals) having the peak frequencies of the spectral data of the beat signals B1 to BN described above, and the phase difference of the beat frequency signals is converted to the frequency. This phase difference is caused by the difference in route length of the radar wave from the reflection object to the respective antenna elements AR1 to ARN, and by converting the phase difference to the frequency, the direction to the reflection object can be calculated on the basis of the frequency thus converted.

Here, in this embodiment, the reception beam of the reception antenna element ARN disposed at the end portion in the reception antenna elements AR1 to ARN is displaced. In the spatial FFT described above, an input signal is weighted when the frequency is calculated. Normally, a smaller weight is applied to the beat frequency signal of the reception antenna element disposed at the end portion than the beat frequency signal of the reception antenna element disposed at the center portion. Therefore, the effect on the detection of the direction to the reflection object can be suppressed to a small level even when the reception beam axis of the reception antenna element ARN disposed at the end portion is displaced.

Furthermore, as described above, in the above embodiment, the amplitude of the peak frequency of the spectral data is used as the amplitude of the reception antenna element ARN. The mechanism for calculating this spectral data is equipped to the conventional radar devices. In other words, the radar device of this embodiment can easily and accurately perform the angle adjustment of the transmission/reception unit 12 while adopting the basic construction of the conventional radar devices with no modification.

(Second Embodiment)

Next, a second embodiment according to the invention will be described. The construction of the radar device according to this embodiment is substantially the same as the first embodiment.

In this embodiment, the same signal processing as the first embodiment is normally carried out on the reception signals fr1 to frN-1 of the reception antenna elements AR1 to ARN-1 having the non-displaced reception beam axes to calculate the distance D to the reflection object, the relative speed V between the vehicle concerned and the reflection object and the direction to the reflection object. When the distance D to the reflection object is less than a predetermined distance (i.e., short distance), the distance D and the relative speed V between the vehicle concerned and the reflection object are calculated on the basis of the reception signal frN of the reception antenna element ARN.

The reception beam axis of the reception antenna element ARN is more downwardly oriented to the ground surface than the reception beam axes of the other reception antenna elements AR1 to ARN-1. Therefore, the maximum detection distance of the reception antenna element ARN is shorter than the other reception antenna elements AR1 to ARN-1. Accordingly, with respect to any reflection object existing at a long distance, the distance D, etc. are calculated from the reception signals fr1 to frN-1 of the reception antenna elements AR1 to ARN-1 having the non-displaced reception beam axes except for the reception antenna element ARN. Accordingly, even when the reception beam axis of the reception antenna element ARN is displaced to the ground surface, the detection performance of the reflection object existing at the long distance can be prevented from being lowered. The reception signal frN of the reception antenna element ARN is used to detect the reflection objects existing at the short distance. That is, the reception antenna element ARN for the short distance detection is set up separately from the reception antenna elements AR1 to ARN-1 for the long-distance detection.

Figure 9:
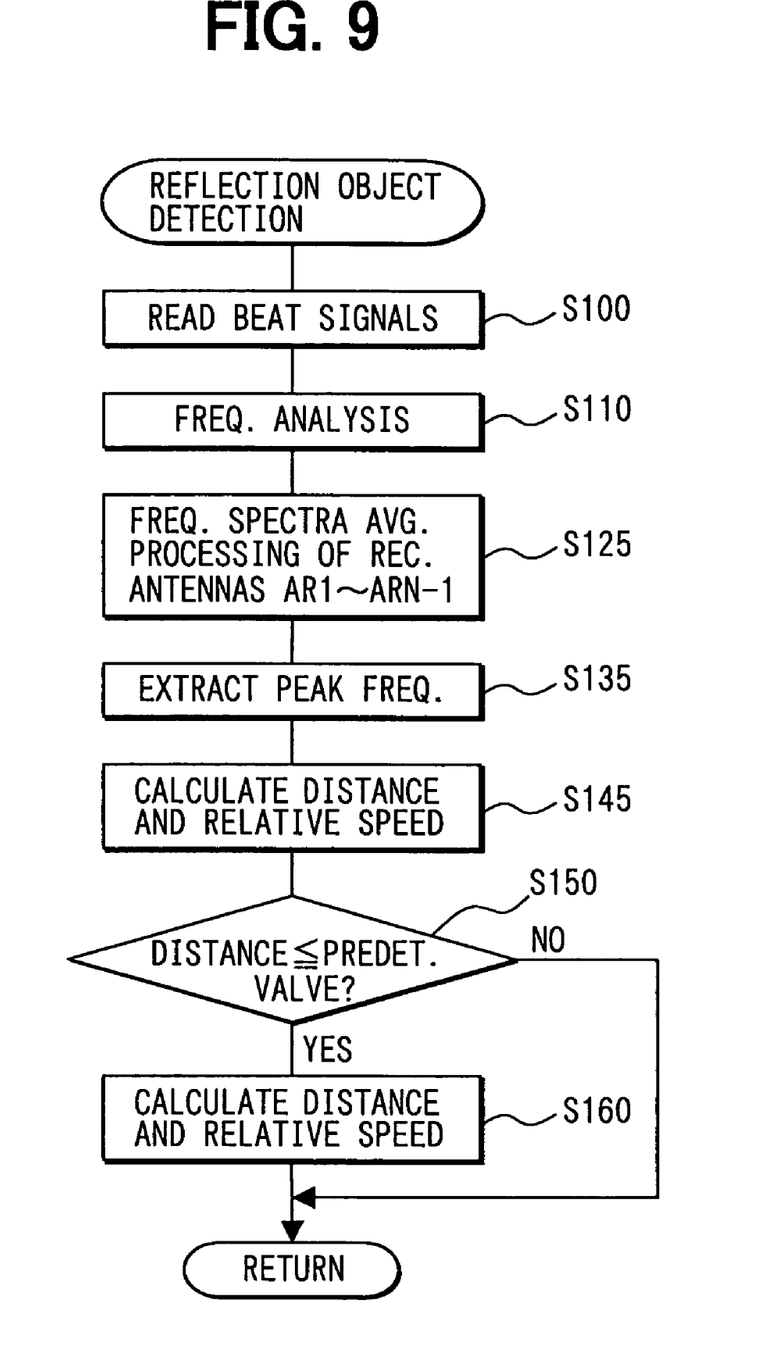
FIG. 9 is a flowchart showing the detection processing of detecting the distance to a reflection object, the relative speed between the vehicle concerned and the reflection object, and the direction to the reflection object in the second embodiment.

FIG. 9 shows the flowchart of the reflection object detection processing executed in the radar device according to the second embodiment.

The processing of steps S100 and S110 is the same as the processing of the first embodiment. In step S125, the frequency spectral data of the reception antenna elements AR1 to ARN-1 having the non-displaced reception beam axes are subjected to the average processing every frequency increasing portion and every frequency decreasing portion. In step S135, the common increasing and decreasing portion peak frequencies of the beat signals B1 to BN-1 are extracted from the averaged increasing and decreasing portion spectral data.

In step S145, the distance D and relative speed V between the vehicle concerned and the reflection object are calculated on the basis of the increasing and decreasing portion peak frequencies thus extracted in step S135 by using the equations 1 to 4, and also the direction to the reflection object is determined. In step S150, it is judged whether the distance D calculated in the step S145 is not more than a predetermined value. At this time, if it is judged that the distance D is not more than the predetermined value and the reflection object exists at a short distance, in step S160, the distance D and relative speed V between the vehicle concerned and the reflection object are calculated again on the basis of the frequency spectral data of the reception antenna element ARN having the displaced reception beam axis.

The preferred embodiments of the invention have been described above. However, the invention is not limited to the above embodiments, and various modifications, changes, etc. may be made without departing from the subject matter of the invention.

For example, in the first and second embodiments described above, the number of the reception antenna element having the displaced reception beam axis is set to one, however, it may be two or more. Furthermore, a plurality of transmission antennas may be equipped.

The amplitude difference calculator, frequency spectrum calculator, reflection object detector and direction detecting unit are preferably implemented by the microcomputer 10. The beat signal generator is preferably implemented by the receiver 6.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A radar device for a vehicle, comprising:
    a reception antenna having plural reception antenna elements arranged along the width direction of the vehicle so that a beam axis of at least one of plural reception beams in the vertical direction is displaced from beam axes of the other reception beams in the vertical direction;
    a transmission antenna having a transmission beam area that covers areas of the reception beams of the plural reception antenna elements; and
    an amplitude difference calculator for making the transmission antenna transmit a transmission signal to a target disposed at a predetermined position when the mount angle for mounting the radar device on the vehicle is adjusted, making the plural reception antenna elements receive a reflection wave of the transmission signal from the target to generate reception signals, and then calculating the amplitude difference between the amplitude of the reception signal of the reception antenna element having the displaced reception beam axis and the amplitude of the reception signal of the reception antenna elements having the non-displaced reception beam axes.

2. The radar device according to claim 1, further comprising a storage unit for storing in advance the relationship between the amplitude difference and the orientation of the reception beam axes of the reception antenna elements having the non-displaced reception beam axes in the vertical direction.

3. The vehicle radar device according to claim 1, wherein the transmission signal is subjected to frequency modulation so that the frequency varies continuously, wherein the amplitude difference calculator is equipped with a beat signal generator for generating beat signals each of which corresponds to the frequency difference between the transmission signal and each of the plural reception signals occurring in the plural reception antenna elements and a frequency spectrum calculator for calculating a frequency spectrum representing the magnitude of each frequency component contained in each of the beat signals generated by the beat signal generator, the amplitude difference being calculated while the peak of the frequency spectrum calculated by the frequency spectrum calculator is set as the amplitude of each reception signal.

4. The vehicle radar device according to claim 3, further comprising a reflection object detector for detecting the distance to a reflection object reflecting the transmission signal and the relative speed between the vehicle concerned and the reflection object on the basis of the peak of the frequency spectrum calculated by the frequency spectrum calculator.

5. The vehicle radar device according to claim 3, further comprising a direction detecting unit for detecting the direction to the reflection object in the vehicle width direction on the basis of the phase difference at the peak frequency of the frequency spectrum calculated by the frequency spectrum calculator.

6. The vehicle radar device according to claim 1, wherein the amplitude of the reception signals of the reception antenna elements having the non-displaced reception beam axes is calculated by averaging the reception signals of the reception antenna elements.

7. The vehicle radar device according to claim 6, wherein when the reception signals of the plural reception antenna elements are averaged, the reception signal of the reception antenna element having the displaced reception beam axis is contained in the plural reception antenna elements.

8. The vehicle radar device according to claim 1, wherein the reception beam axis of a reception antenna element disposed at an end portion of the vehicle in the vehicle width direction is displaced among the plural reception antenna elements.

9. The vehicle radar device according to claim 4, wherein the reception beam axis is displaced so as to direct to the ground surface, and the reflection object detector may use the reception signals of the reception antenna elements having the non-displaced reception beam axes in order to detect reflection objects spaced from the vehicle concerned at a predetermined distance or more and use the reception signal of the reception antenna element having the displaced reception beam axis in order to detect reflection objects existing within a predetermined distance from the vehicle concerned.

10. A method of adjusting a mount angle at which a vehicle radar device is mounted on a vehicle, the vehicle radar device containing a transmission antenna and a reception antenna comprising plural reception antenna elements disposed along a vehicle width direction so that the beam axis in the vertical direction of at least one reception beam in plural beam axes is displaced from the beam axes in the vertical direction of the remaining beam axes, the method comprising:
    transmitting a transmission signal to a target disposed at a predetermined position;
    receiving a reflection wave of the transmission signal from the target through plural reception antenna elements and generating reception signals; and
    calculating the amplitude difference between the amplitude of a reception signal of a reception antenna element having a displaced reception beam axis and the amplitude of reception signals of reception antenna elements having non-displaced reception beam axes.

11. The method according to claim 10, wherein the relationship between the amplitude difference and the direction of the reception beam axis of the reception antenna elements having the non-displaced reception beam axes is determined in advance, and the mount angle of the reception antenna in the vehicle vertical direction is adjusted on the basis of the relationship thus determined.

12. The method according to claim 10, wherein the transmission signal transmitted from the transmission antenna is frequency-modulated so that the frequency thereof varies continuously, and wherein a beat signal corresponding to the frequency difference from the transmission signal is generated from each of plural reception signals occurring in the plural reception antenna elements, a frequency spectrum indicating the magnitude of each frequency component contained in the beat signal is calculated for each beat signal, and the amplitude difference is calculated while the peak of the frequency spectrum concerned is set as the amplitude of the reception signal.

13. The mount angle adjusting method according to claim 10, wherein the amplitude of the reception signal of the reception antenna elements having the non-displaced reception beam axes is calculated by averaging the reception signals of the plural reception antenna elements.

14. The mount angle adjusting method according to claim 13, wherein the reception signal of the reception antenna element having the displaced reception beam axis is contained in the plural reception signals of the plural reception antenna elements when the reception signals of the plural reception antenna elements are averaged.

* * * * *